United States Patent [19]

Blount

[11] Patent Number: 5,010,113

[45] Date of Patent: Apr. 23, 1991

[54] FLAME-RETARDANT POLYURETHANE PRODUCTS

[76] Inventor: David H. Blount, 6728 Del Cerro Blvd., San Diego, Calif. 92120

[21] Appl. No.: 360,152

[22] Filed: Jun. 1, 1989

[51] Int. Cl.$^5$ .............................................. C08G 18/14
[52] U.S. Cl. .................................. 521/107; 521/906; 524/707
[58] Field of Search ................. 521/107, 906; 524/707

[56] References Cited

U.S. PATENT DOCUMENTS 4,529,742  7/1985  von Bonin et al. ................. 521/107

Primary Examiner—Maurice J. Welsh

[57] ABSTRACT

Flame-retardant polyurethane products are produced by mixing and reactive an amino-salt of a phosphorus acid, a compound containing at least two reactive hydrogens, and a compound containing at least two isocyanate radicals. This improved polyurethane product may be used in many forms such as insulating and sound proofing foam, coating agents, cushions, cavity fillers, molded products and the like.

21 Claims, No Drawings

FLAME-RETARDANT POLYURETHANE PRODUCTS

BACKGROUND OF THE INVENTION

This invention relates to the production of flame-retardant polyurethane products by an improved process which utilizes amino salts of phosphorus acids as the flame-retardant and in production of foams a hydrated amino salts of phosphorus acids are used. The hydrated flame-retardant products also function as the blowing agent because the water is slowly released thereby greatly reducing the need for halogenated blowing agents.

The amino salts of phosphorus acids are produced by mixing and reacting an amino compound and a phosphorus acid type compound. In the process of this invention, low-cost and readily available compounds are utilized in the production of the flame-retardant compounds. Many types of flame-retardant chemicals have been used in polyurethane production but there is still a need for a flame-retardant which can be used, especially in flexible polyurethane foams, that is predominantly inorganic, that is relatively inexpensive, that will act as the blowing agent, that prevents the foam from burning and reduce smoke production. The flame-retardants of this invention will fill this need.

DESCRIPTION OF THE PRIOR ART

In U.S. Pat. No. 3,134,742, Wismer, et al flame resistance polyurethane foams were produced utilizing the combination of a liquid phosphorus-containing polyol and a compound containing a relatively high proportion of nitrogen and phosphorus containing the group

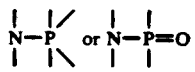

This invention is an improvement over U.S. Pat. No. 3,134,742 because it is not necessary to utilize a liquid phosphorus containing polyol with the amino salts of phosphorus acids of this invention. The amino salts of phosphorus acids produced in this invention is a different type compound than that utilized in U.S. Pat. No. 3,134,742. The amino salts of phosphoric acids of this invention contains the group

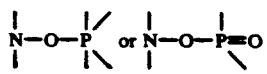

This N is attached to an O instead of a P. It is preferred that the phosphorus acids contain water thereby producing a hydrated flame-retardant product. The attached water improves the flame retardation and also acts as a blowing agent.

In U.S. Pat. No. 3,134,742 phosphoric acid which contained water was used but the water was first reacted with phosphorus pentoxide to form a phosphorus acid which contains no water before being reacted with nitrogen containing products or polyols to produce anhydrous products. In this invention water is preferred to be present in order to produce hydrated flame-retardant products.

SUMMARY OF THE INVENTION

Non-amine nitrogen-containing substances such as amides, aliphatic substituted amides, amino compound, etc. may be used in this invention with phosphorus acid compounds to produce amino salts of phosphorus acids. While not wishing to be bound by any theory of operation, it appears that the flame-retardant amino salts of phosphorus acids act as a flame-retardant by creating a char formation when heated by a flame. The hydrated water also contributes to the flame-retardation properties.

Flame-retardant polyurethane products are produced by mixing and reacting the following components:

Component A: Amino salts of phosphorus acids; in the amount of 1 to 40 parts by weight;

Component B: Compound containing 1 or more active hydrogen or epoxide radical or both active hydrogens and epoxide radicals that will react with an isocyanate radical in the amount of 25 to 100 parts by weight;

Component C: Compound which contains at least two isocyanate radicals or a compound which contains at least one isocyanate radical and an unsaturated bond which will polymerize with a catalytic amount of a free-radical initiator, in the amount of 5 to 100 parts by weight.

Component (A)

Flame-retardant amino salts of phosphorus acids are produced by mixing and reacting the following Components:
(A) non-amine nitrogen containing compounds
(B) phosphorus acid compounds
(C) water The amino salts of phosphorus acids contain the group

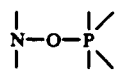

which usually contains oxygen to provide the structure:

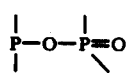

and contains at least 15% nitrogen and at least 15% of phosphorus by weight.

Any suitable non-amine nitrogen containing compound may be used in this invention. Suitable non-amine compounds are amino compounds include but not limited to urea, urea-formaldehyde condensate, melamine, melamine-formaldehyde condensate, cyanamide, dicyandiamide, biuret, guanidine, dimethylol urea, ammonium carbamate, urea derivatives, aminoguanidine and mixtures thereof.

Urea is the preferred amino compound. Other urea compounds having the general formula

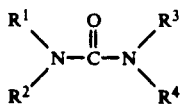

wherein at least one of R¹, R², R³ and R⁴ represents hydroxyalkyl, alkoxyalkyl, alkyl and aryl groups and the remains represent hydrogen atoms. Such urea derivative are N-methylol urea, N,N'-dimethylol urea, N-ethylol urea, N,N'-dimethoxymethyl urea, N-methyl urea, N,N'-dimethyl urea, N-ethyl urea, N,N'-diethyl urea, N,-phenyl urea, etc. and mixtures thereof may be used in this invention.

Any suitable phosphorus acid compound may be used in this invention. Suitable phosphorus acid compounds include but are not limited to phosphoric acid, phosphorus acid, metaphosphoric polyphosphoric acid, pyrophosphoric acid, hypophosphoric acid, phosphinic acid, phosphonic acid, phosphonous acid, phosphinous acid, phosphine oxide, phosphorus oxychloride, ammonium dihydrogen phosphate and mixtures thereof. When water is present in the reactive mixture oxides of phosphorus, halides of phosphorus and phosphorus oxyhalides may be used because they react with the water to form phosphorus acids.

Phosphoric acid containing 15-50% water is the preferred phosphorus acid compound.

The preferred process to produce flame-retardant amino salts of a phosphorus acid is to mix the amino compound and acids of phosphorus then heat the mixture of about 80° C. to 110° C. while agitating for 10 to 30 minutes. The chemical reaction is exothermic. When the reaction is complete a solid or semi-solid product is formed and the solid product is ground into a fine powder.

The chemical reaction between the non-amine nitrogen containing compound and acids of phosphorus may take place at any suitable temperature or pressure, preferable between ambient temperature and 110° C. and at ambient pressure. Water may be evaporated from the amino salts of phosphorus acids when desired.

The proportion of the reactants to produce amino salts of phosphorus acids may vary greatly, an excess of either the amino compound or the acid of phosphorus may be used but preferred to vary within the following range:

(a) 30 to 150 parts by weight of a non-amine nitrogen containing compound
(b) 100 parts by weight of an acid of phosphorus.

Amino salt of phosphorus acid-polyol emulsion may be produced by mixing 1 to 50 parts by weight of the amino salt of phosphorus acid, 20 to 100 parts by weight of a liquid polyol and up to 20% by weight of an emulsifying agent at a temperature of ambient to 100° C. then emulsifying the mixture percentage based on weight of Components A, B and C. This emulsion may be used as a component in producing polyurethane products.

Component (B)

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4- and -2,3-glycol; propylene-1,2- and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of BF₃, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae: $RSH$, $RCH_2CL$, $RCH_2Br$, $RCH_2I$, $RCN$, $RNO_2$, $RCOCL$, $RCOBr$, $RSO_2CL$, $RCOOH$, $RS_3OH$, $RCOO$, $RSO_3$, $ROR$,

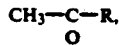

wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2-4 and is incorporated into this application. The polyepoxy compounds are well known in the Arts and are the preferred epoxy compound.

Component (C)

Any suitable organic compound containing at least 2 isocyanate radicals may be used in this invention. Suitable organic polyisocyanates may be aliphatic, cycoloaliphatic, araliphatic, aromatic and heterocyclic polyisocyanates are well known in the arts. Suitable polyisocyanates which may be employed in the process of the invention are exemplified by the organic diisocyanate which are compounds of the general formula:

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6-diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

The components may be mixed in any suitable method to produce polyurethane products. It is preferable to first mix or emulsify components A and B then mix components A and B with component C. The components may be mixed simultaneously. Components B and C may be first reacted to produce a polyisocyanate prepolymer. The mixing and reacting of the components may take place at any suitable temperature or pressure. Usually ambient temperature and pressure are satisfactory. In certain cases elevated temperature and/or pressure is desirable.

In certain products such as polyurethane insulation product a small amount of halogenated hydrocarbons may be desirable to improve the insulation properties. Other blowing agents may also be used with the compounds with attached water when desired. Up to 20 percent by weight of an inert liquid, boiling in the range of 25° C. to 80° C., may be included in the reaction mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acids with amines, e.g., oleic acid diethyl-amine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Polyurethane catalyst may be used in the production of polyurethane silicate products such as tertiary amines, silaamines, bases containing nitrogen such as tetraalkyl ammonium, alkali metal phenolates, sodium hydroxide, alkali metal alcoholates, amino compounds, hexahydrotriazines and organic metal compounds, especially organic tin compounds. These catalysts are well known in the arts.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in the aqueous alkali metal silicate, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photo-polymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5–12 and is incorporated into this Application.

Optional components may be added in any suitable proportions, the preferred proportions being:
1. up to 20% by weight of an emulsifying agent, percentage based on components A, B and C.
2. up to 20% by weight of a foam stabilizer, percentage based on Components A, B and C.
3. up to 10% by weight of a urethane catalyst, percentage based on Components A, B and C.
4. up to 300% by weight of a filler, inorganic or organic particulate or pulverulent material, percentage based on Components A, B and C.
5. up to 300% by weight of a modifying compound, percentage based on Components A, B and C.
6. up to 25% by weight of a phase-change material, percentage based on Components A, B and C.
7. up to 10% by weight of a flame-retardant agent, percentage based on Components A, B and C.
8. up to 5% by weight of a free radical-initiator, percentage based on Components A, B and C.
9. up to 20% by weight of an inert liquid, boiling in the range of −25° C. to 80° C.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethyene glycol) waxed and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113. Additional flame-retardant agents are usually not necessary in this invention.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide an improved process using amino salts of phosphorus acids with attached water to produce polyurethane flame-retardant foam without using the atmosphere damaging halogenated hydrocarbons as blowing agents. Another object is to produce improved flame-retardant polyurethane products that do not contain halogenated hydrocarbons and may be used for thermal insulation, structural purposes, sound proofing, shock-resistant packaging, cushions, adhesives, casting material, cavity filling material, etc. Another object is to provide an improved process wherein the amino salts of phosphorus acids with attached water used to produce carbon dioxide by its reaction with isocyanate radicals is slowly released giving sufficient time for the isocyanate radicals to also react with the polyol thereby producing an improved product over when free water is used.

DESCRIPTION OF PREFERRED EMBODIMENTS

My invention will be illustrated in greater detail in the specific examples which follow, which detail the preferred embodiment of my process. It should be understood that the scope of my invention is not limited to the specific processes set out in the examples. Parts and percentages are by weight, unless otherwise indicated.

The following examples illustrate the reaction of a nonamine nitrogen containing compound with a phosphorus acid compound to produce a solid amino salt of phosphorus acid which can be utilized in the production of flame-retardant polyurethane products.

EXAMPLE A

About 40 parts by weight of urea and 40 parts by weight of phosphoric acid containing 25% water by weight are mixed then heated to about 100° C. while agitating until the urea melts. The chemical reaction is exothermic and no further heating is necessary. The mixture is agitated until it cools and solidifies. The chemical reaction is completed in about 1-2 hours thereby producing a urea salt of phosphoric acid. The compound is ground into a powder.

EXAMPLE B

Example A is modified wherein various amounts of urea is used and selected from the list below:
(a) 15 parts by weight
(b) 20 parts by weight
(c) 30 parts by weight
(d) 40 parts by weight
(e) 50 parts by weight
(f) 60 parts by weight

EXAMPLE C

Example A is modified wherein 20% by weight of the urea is replaced with a compound listed below:
(a) melamine
(b) guanidine
(c) dicyanodiamide
(d) dimethylol urea
(e) uric acid
(f) ammonium carbonate
(g) urea-formaldehyde condensate
(h) melamine-formaldehyde condensate
(i) cyanamide
(j) biuret
(k) cyanoguanidine

EXAMPLE D

Example A is modified wherein the phosphoric acid containing 25% water is replaced with a phosphorus acid listed below:
(a) phosphoric acid containing 15% water
(b) phosphinic acid containing 25% water
(c) phosphinous acid containing 25% water
(d) hypophosphorus acid containing 15% water
(e) ammonium dihydrogen phosphate containing 25% water
(f) phosphorus oxide with 10 parts by weight of water
(g) phosphorus oxychloride with 10 parts by weight of water

EXAMPLE E

Example A is modified wherein the urea is replaced with a compound listed below:
(a) melamine
(b) guanidine
(c) dicyanodiamide
(d) dimethylol urea
(e) uric acid
(f) urea-formaldehyde condensate
(g) biuret
(h) cyanoguanadine

EXAMPLE F

About 50 parts by weight of the hydrated urea salt of phosphoric acid produced in Example A are mixed with 100 parts by weight of a liquid polyol then heated to about 100° C. or until the hydrated salt melts then the mixture is emulsified thereby producing an amino salts of phosphorus acid-polyol emulsion.

The following examples illustrate the reaction of an amino salt of phosphorus acids, polyols and polyisocyanates to produce flame-retardant polyurethane products.

EXAMPLE 1

About 30 parts by weight of poly(oxyalkylene)triol (Multranol 3900 by MOBAY), 12 parts by weight of urea salt of phosphoric acid of Example 1, 0.3 parts by weight of tin octoate, 0.3 parts by weight of weight of amine catalyst (DABCO R8020 by DABCO), 0.2 parts by weight of silicone foam stabilizer (L-6202 by Union Carbide) and 12 parts by weight of tolylene diisocyanate (TD1 80 by MOBAY) are mixed. The mixture expands to produce a flexible foam of about 1.7 lbs/cu. ft. After the foam was cured for 3 weeks it was tested by placing a propane flame of ¼" in length about 1" from the foam for about 15 seconds. The foam melted and the flame stopped as soon as the flame was removed, the flame did not spread and the melted material did not burn.

EXAMPLE 2

Example 1 is modified wherein another polyol is used in place of the poly(oxylkylene)triol and selected from the list below:
(a) polypropylene triol, mol. wt. 3000, OH-56
(b) polypropylene triol, mol. wt. 3000, OH-42
(c) poly(oxyalkylene)triol, mol. wt. 3000, OH-57
(d) polyehtylenepropylene triol, mol. wt. 3000, OH-56
(e) poly(oxyalkylene)triol, mol. wt. 3000, OH-46
(f) polypropylene diol, mol. wt. 2000, OH 178

EXAMPLE 3

Example 1 is modified wherein another amino salt of phosphoric acid is used and selected from examples listed below:
(a) Ba
(b) Bb
(c) Bc
(d) Be
(e) Bf
(f) Ca
(g) Cb
(h) Cc
(i) Cg
(j) Ck
(k) Da
(l) Dc
(m) De
(n) Df
(o) Ea
(p) Eb
(q) Ec
(r) Ef
(s) Eh

EXAMPLE 4

About 20 parts by weight of a sucrose polyol (NIAX HDM 361 by UNION CARBIDE), 10 parts by weight of the urea salt of phosphoric acid produced in example A, 0.1 parts by weight of tin octoate, 0.1 parts by weight of an amine catalyst (DABCO R8020 by AIR PRODUCTS), 0.2 parts by weight of silicone foam stabilizer (L5420 by UNION CARBIDE) and 25 parts by weight of polymeric MDI (MONDUR MR by MOBAY) are mixed. The mixture expands to produce a strong rigid foam of about 2.5 lbs/cu. ft.

The rigid foam is flame tested by using a propane torch flame of ¼" in length and placed about 1" from the foam. The foam surface chars in a few seconds and the flame does not spread. The flame was left in place for about 5 minutes and a charred area was formed to about 2 cm depth in front of the flame but the flame did not spread. Very little smoke was produced.

EXAMPLE 5

Example 4 is modified wherein 2 parts by weight of trichlorofluoromethane was added with he polyol thereby producing a rigid foam of about 2 lbs./cu. ft.

EXAMPLE 6

Example 4 is modified wherein another amino salt of phosphorus acid is used in place of the urea salt of phosphoric acid and selected from the list of examples below:
(a) Ba
(b) Bb
(c) Bc
(d) Be
(e) Bf
(f) Ca
(g) Cb
(h) Cc
(i) Cg
(j) Ck
(k) Da
(l) Dc
(m) De
(n) Df
(o) Ea
(p) Eb
(q) Ec
(r) Ef
(s) Eh

EXAMPLE 7

Example 4 is modified wherein another polyol is used in place of the sucrose polyol and selected from the list below:
(a) aromatic polyester polyol, hydroxyl no. 350
(b) sucrose amine polyol, hydroxyl no. 413
(c) phenyl amine polyol, hydroxyl no. 350
(d) sorbitol-based polyol, hydroxyl no. 490
(e) polypropylene diol, hydroxyl no. 170, with 25% by weight of polypropylene polyol, hydroxyl no. 650
(f) aromatic polyester polyol, hydroxyl no. 350 with 25% by weight of polypropylene polyol hydroxyl no. 650.

EXAMPLE 8

Example 4 is modified wherein another polyisocyanate is used in place of Mondur MR by MOBAY and selected from the list below:
(a) Polymeric MDI (PAPI 27 by UPJOHN)
(b) modified polyisocyanate (MONDUR MR by MOBAY)
(c) methylene diphenyl isocyanate
(d) aromatic polyisocyanate (MONDUR M-294 by MOBAY)

EXAMPLE 9

Tolylene diisocyanate is reacted with hydroxyethyl methacrylate to produce a NCO-terminated prepolymer, then 30 parts by weight of the prepolymer, 5 parts by weight of urea salt of phosphoric acid produced in example A (with the water removed by evaporation), and a catalytic amount of organic hydroperoxide are mixed. The mixture solidifies. The solid is tested with a propane torch and a char is formed and the flame does not spread.

Other unsaturated aliphatic isocyanate compounds which has double-bond vinyl functionality and isocyanate functionality in the same molecule may be used in place of the above prepolymer.

EXAMPLE 10

About 30 parts by weight of a polyepoxy resin (glycidyl ether of dihydric phenol), 0.2 parts by weight of a foam stabilizer (L5420 by Union Carbide), 0.25 parts by weight of an amine urethane catalyst (DABCO R8020 by AIR PRODUCT), 8 parts by weight of the urea salt of phosphoric acid produced in example A, 0.1 parts by weight of tin octoate are mixed then the mixture is mixed with 30 parts by weight of polymeric MDI (MONDUR MR by MOBAY), the mixture slowly expands to produce a strong rigid foam of about 2-3 lbs./cu. ft.

The foam is flame tested with a propane torch and the flamed area forms a char and the flame does not spread.

EXAMPLE 11

Example 4 is modified wherein a modifying compound in the amount of 5 parts by weight is added to the polyol and selected from the list below:
(a) epoxy resin
(b) aminoplast powder
(c) phenoplast resin
(d) fatty acid
(e) cellulose powder
(f) lignin
(g) melamine powder
(h) polysulfide polymer
(i) furfural-ketone resin
(j) cyanoquanodine powder
(k) styrene with catalytic amount of benzyl peroxide
(l) polyepichlorohydrin polymer
(m) polyester resin with a catalytic amount of methyl ethyl ketone peroxide
(n) phthalate
(o) polyester benzoate

EXAMPLE 12

Example 11 is modified wherein the polyepoxy resin is a phenol-formaldehyde resin containing epoxide radicals.

EXAMPLE 13

About 60 parts by weight of the urea salt of phosphoric acid-polyol emulsion of example F, wherein the polyol is selected from the list below, 0.4 parts by weight of water, 0.2 parts by weight of a foam stabilizer (L6202 by Union Carbide), 0.4 parts by weight of tin octoate and 0.5 parts by weight of an amine catalyst (DABCO R8020 by AIR PRODUCTS) are mixed, the mixture is then mixed with 15 parts by weight of tolylene diisocyanate (TDI 80 by MOBAY). The mixture expands to a flexible foam of about 1.5 lbs./cu. ft.

After 2 weeks the foams are flame tested by placing a propane torch with a ½" long flame about one inch from the foam for about 15 seconds. The foam melts but the flame does not spread. The flame stops as soon as the torch is removed. The polyol is selected from the list below:
(a) poly(oxylakylene)triol, mol. wt. 3000, OH-57
(b) poly(oxyalkylene)triol, mol. wt. 3000, OH-46
(c) polypropylene triol, mol. wt. 3000, OH-56
(d) polypropylene triol, mol. wt. 3000, OH-42
(e) polypropylene diol, mol. wt. 2000, OH-178

EXAMPLE 14

Example 13 is modified wherein the amino salt of phosphorus acid is replaced with one selected from the following examples:
(a) Ca
(b) Cb
(c) Cc
(d) Cd
(e) Cg
(f) Ch
(g) Ck

EXAMPLE 15

Example 4 is modified wherein about 5 parts by weight of a phase-change material, a mixture of paraffin waxes with a freezing (solidifying) point of about 70° F. and a melting point of about 72° F., is added in a liquid form and emulsified with the polyol.

Although specific materials and conditions were set forth in the above examples, these were merely illustrative of preferred embodiment of my invention. Various other compositions, such as the typical materials listed above may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention as defined in the appended claims.

I claim:

1. A flame-retardant polyurethane product which is formed from a mixture comprising:
   (A) an amino salt of phosphorus acid selected from the group of compounds produced by reacting a phosphorus acid compound with an amino compound selected from the group consisting of urea, urea-formaldehyde condensate, melamine, melamine-formaldehyde condensate, cyanamide, dicyandiamide, biuret, guanidine, dimethylol urea, ammonium carbamate, urea derivatives, amino-guanidine and mixtures thereof;
   (B) a polyol, selected from the group consisting of polyether polyols prepared by the polymerization of epoxides selected from the group consisting of propylene oxide, butylene oxide, tetrahydrofurane oxide, styrene oxide or epichlorohydrin, each with itself or by addition of these or by addition of these epoxides with starting components selected from the group consisting of water, propylene-1,3- or -1,2-glycol, trimethyol propane, 4,4-dihydroxydiphenyl propane, aniline, ammonia, ethanolamine, ethylenediamine and sucrose, polythioether polyols, polyacetals polyols, polycarbonate polyols, polyester amide polyols, hexane polyols, octane polyols, neopentyl polyols, pentaerythritol, quinitol, mannitol, sorbitol, methylglycoside, polybutadiene polyols, and polypropylene polyols modified with vinyl polymers;
   (C) a compound which contains at least two isocyanate radicals.

2. The product of claim 1 wherein the amino salt of phosphorus acid is urea salt of phosphoric acid.

3. The product of claim 1 wherein the amino salt of phosphorus acid has the general structural formula of

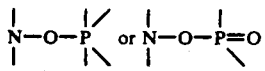

and contains at least 15% by weight of a nitrogen and at least 15% by weight of phosphorus.

4. A flame-retardant cellular polyurethane product which is formed from a mixture comprising:
 (A) a urea salt of phosphorus acid;
 (B) a polyol, selected from the group consisting of polyether polyol prepared by the polymerization of epoxides selected from the group consisting of propylene oxide, butylene oxide, tetrahydrofurane oxide, styrene oxide or epichlorohydrin, each with itself or by addition of these or by addition of these epoxides with starting components selected from the group consisting of water, propylene-1,3- or -1,2-glycol, trimethylol propane, 4,4-dihydrodiphenyl propane, aniline, ammonia, ethanolamine, ethylenediamine and sucrose, polythioether polyols, polyacetals polyols, polycarbonate polyols, polyester amide polyols, hexane polyols, octane polyols, neopentyl polyols, pentaerythritol, quinitol, mannitol, sorbitol, methyl glycoside, polybutadiene polyols, and polypropylene polyols modified with vinyl polymers;
 (C) a compound which contains at least two isocyanate radicals;
 (D) a blowing agent for polyurethane resins.

5. A flame-retardant cellular polyurethane material which is formed from a mixture comprising:
 (A) a hydrated urea salt of phosphonic acid;
 (B) a polyol, selected from the group consisting of polyether polyols prepared by the polymerization of epoxides selected from the group consisting of propylene oxide, butylene oxide, tetrahydrofurane oxide, styrene oxide or epichlorohydrin, each with itself or by addition of these epoxides or addition of these epoxides with starting components selected from the group consisting of water, propylene-1,3- or -1,2-glycol, trimethylol propane, 4,4-dihydrodiphenyl propane, aniline, ammonia, ethanolamine, ethylenediamine and sucrose, polythioether polyols, polyacetal polyols, polycarbonate polyols, polyester amide polyols, hexane polyols, octane polyols, neopentyl polyols, pentaerythritol, quinitol, mannitol, sorbitol, methyl glucoside, polybutadiene polyols and polypropylene polyols modified with vinyl polymers;
 (C) an organic polyisocyanate 6. A process for producing a flame-retardant cellular polyurethane product which comprises of mixing and reacting a mixture of:
 (A) an amino salt of phosphorus acid selected from the group of compounds produced by reacting a phosphorus acid compound with an amino compound selected from the group consisting of urea, urea-formaldehyde condensate, melamine, melamine-formaldehyde condensate, cyanamide, dicyandiamide, biuret, guanidine, dimethylol urea, ammonium carbamate, urea derivatives, amino-guanidine and mixtures thereof, in the amount of 1 to 40 parts by weight;
 (B) a polyol, selected from the group consisting of polyether polyols prepared by the polymerization of epoxides selected from the group consisting of propylene oxide, butyene oxide, tetrahydrofurane oxide, styrene oxide or epichlorohydrin, each with its self or by addition of these epoxides or by addition of these epoxides with starting components selected from the group consisting of water, propylene-1,3- or -1,2-glycol, trimethylol propane, 4,4-dihydrodiphenyl propane, aniline, ammonia, ethanolamine, ethylenediamine and sucrose, polythioether polyols, polyacetals polyols, polycarbonate polyols, polyester amide polyols, hexane polyols, octane polyols, neopentyl polyols, pentaerythritol, quinitol, mannitol, sorbitol, methyl glycoside, polybutadiene polyols and polypropylene polyols modified with vinyl polymers, in the amount of 25 to 100 parts by weight;
 (C) a compound which contains at least two isocyanate radicals in the amount of 5 to 100 parts by weight;
 (D) a blowing agent for polyurethane resins in the amount up to 20% by weight, based on components A, B and C, and foaming and curing the resulting mixture to a cellular product.

7. The process of claim 6 wherein the amino salts of phosphorus acid contains attached water.

8. The process of claim 6 wherein the compounds which contain 2 or more isocyanate radicals are selected from the group consisting of aliphatic, cycloaliphatic, araliphatic, aromatic and hetero-cyclic polyisocyanates and polyisocyanates which are obtained by phosgenating aniline-aldehyde condensates and mixtures thereof.

9. The process of claim 6 wherein the compound which contains 2 or more isocyanate radicals in replaced with a compound which contains 1 or more isocyanate radicals and one or more unsaturated bonds which will polymerize and a catalytic amount of a free-radical initiator.

10. The process of claim 6 wherein up to 20% by weight of an emulsifying agent is added to Component A, B or C, based on weight of Component A, B and C.

11. The process of claim 6 wherein up to 20% by weight of a foam stabilizer is added to components A, B or C, based on weight of Components A, B and C.

12. The process of claim 6 wherein up to 10% by weight of a urethane catalyst is added to Components A, B or C, based on weight of Components A, B and C.

13. The process of claim 6 wherein up to 200% by weight of a filler is added to Components A, B or C, based on weight of Components A, B and C.

14. The process of claim 6, wherein up to 300% by weight of a modifying compound is added to Component A, B or C, based on weight of Components A, B and C.

15. The product produced by the process of claim 6.

16. The flame-retardant product produced by mixing and reacting the following components:
 (A) an amino salts of phosphorus acid selected from the group of compounds produced by reacting a phosphorus acid compound with an amino compound selected from the group consisting of urea, urea-formaldehyde condensate, melamine, melamine-formaldehyde condensate, cyanamide, dicyandiamide, biuret, guanidine, dimethylol urea, ammonium carbamate, urea derivatives, amino-guanidine and mixtures thereof;

(B) a compound which contains 1 or more isocyanate radicals and one or more unsaturated bonds which will polymerize;
(C) a free-radical initiator.

17. The product of claim 1 wherein component (A) and component (B) are mixed and emulsified before mixed with component (C).

18. The product of claim 4 wherein (A) a urea salt of phosphoric acid and (B) a polyol are mixed and emulsified before mixed with (C) a compound which contains at least two isocyanate radicals.

19. The product produced by the process of claim 9.

20. The process of claim 9 wherein up to 20% by weight of phase-change material is added to components, percentage based on weight of Components A, B and C.

21. The product produced by the process of claim 20.

* * * * *